(12) United States Patent
Taguchi et al.

(10) Patent No.: US 8,315,015 B2
(45) Date of Patent: Nov. 20, 2012

(54) PERPENDICULAR MAGNETIC RECORDING HEAD PROVIDED WITH SIDE SHIELD AND MAGNETIC DISK APPARATUS USING THE SAME

(75) Inventors: Tomoko Taguchi, Kunitachi (JP);
Tomomi Funayama, Tokorozawa (JP);
Yuka Aoyagi, Tachikawa (JP);
Katsuhiko Koui, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/431,004

(22) Filed: Mar. 27, 2012

(65) Prior Publication Data
US 2012/0182646 A1    Jul. 19, 2012

Related U.S. Application Data

(62) Division of application No. 11/797,447, filed on May 3, 2007, now Pat. No. 8,169,741.

(30) Foreign Application Priority Data

May 11, 2006  (JP) .................................. 2006-132844
Oct. 31, 2006  (JP) .................................. 2006-297011

(51) Int. Cl.
*G11B 5/127*    (2006.01)
(52) U.S. Cl. ................ 360/125.3; 360/125.03
(58) Field of Classification Search ............... 360/125.3, 360/125.16, 125.03
See application file for complete search history.

(56) References Cited

U.S. PATENT DOCUMENTS

| | | |
|---|---|---|
| 6,477,002 B1 | 11/2002 | Mizoh |
| 6,842,313 B1 | 1/2005 | Mallary |
| 6,954,340 B2 | 10/2005 | Shukh et al. |
| 7,002,775 B2 | 2/2006 | Hsu et al. |
| 7,068,453 B2 | 6/2006 | Terris et al. |
| 7,070,698 B2 | 7/2006 | Le |
| 7,106,554 B2 | 9/2006 | Guan et al. |
| 7,322,095 B2 | 1/2008 | Guan et al. |
| 7,573,683 B1 | 8/2009 | Benakli et al. |
| 7,639,452 B2 | 12/2009 | Mochizuki et al. |
| 7,649,712 B2 | 1/2010 | Le et al. |
| 7,684,149 B2 | 3/2010 | Mochizuki et al. |
| 7,715,147 B2 | 5/2010 | Feldbaum et al. |
| 7,715,152 B2 | 5/2010 | Okada et al. |
| 7,804,666 B2 | 9/2010 | Guan et al. |
| 7,821,736 B2 | 10/2010 | Che et al. |
| 7,990,655 B2 | 8/2011 | Yazawa et al. |

(Continued)

FOREIGN PATENT DOCUMENTS

CN    1542738    11/2004

(Continued)

*Primary Examiner* — Brian Miller
(74) *Attorney, Agent, or Firm* — Pillsbury Winthrop Shaw Pittman, LLP

(57) ABSTRACT

According to one embodiment, a perpendicular magnetic recording head includes a main pole which generates a recording magnetic field, a return pole which forms a closed magnetic circuit for the recording magnetic field, and a side shield magnetically spaced from the main pole in a cross-track direction in which a point on a trailing edge of the side shield which is closest to the main pole is positioned on a leading side of a trailing edge of the main pole.

4 Claims, 15 Drawing Sheets

U.S. PATENT DOCUMENTS

| | | |
|---|---|---|
| 8,049,988 B2 | 11/2011 | Kameda et al. |
| 8,085,500 B2 | 12/2011 | Yazawa et al. |
| 2002/0176214 A1* | 11/2002 | Shukh et al. ............ 360/317 |
| 2004/0066579 A1 | 4/2004 | Yamanaka |
| 2004/0212923 A1* | 10/2004 | Taguchi ............ 360/125 |
| 2005/0083605 A1 | 4/2005 | Hu et al. |
| 2005/0105213 A1 | 5/2005 | Takeo et al. |
| 2005/0237665 A1 | 10/2005 | Guan et al. |
| 2006/0103977 A1 | 5/2006 | Lee et al. |
| 2006/0262453 A1 | 11/2006 | Mochizuki et al. |
| 2007/0253107 A1 | 11/2007 | Mochizuki et al. |
| 2008/0273276 A1 | 11/2008 | Guan |
| 2010/0328816 A1 | 12/2010 | Guan et al. |

FOREIGN PATENT DOCUMENTS

| | | |
|---|---|---|
| CN | 1661678 | 8/2005 |
| JP | 2005-190518 | 7/2005 |
| JP | 2007-207419 | 8/2007 |
| JP | 2007-242210 | 9/2007 |

* cited by examiner

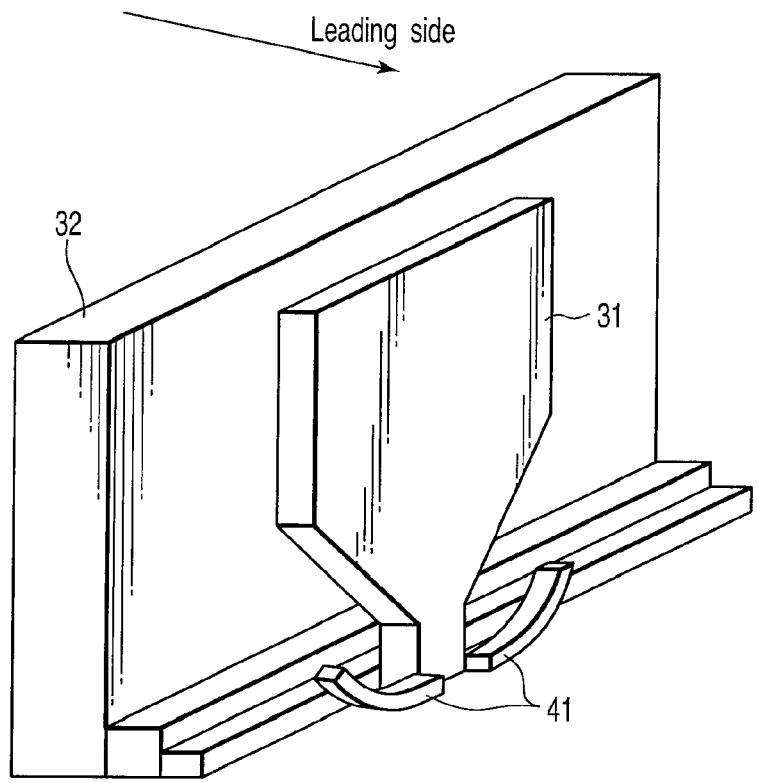
F I G. 3
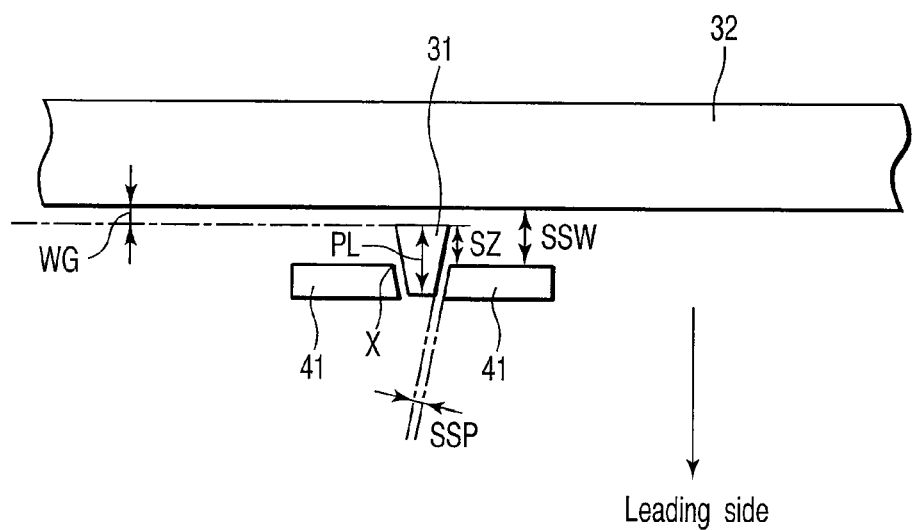
F I G. 4

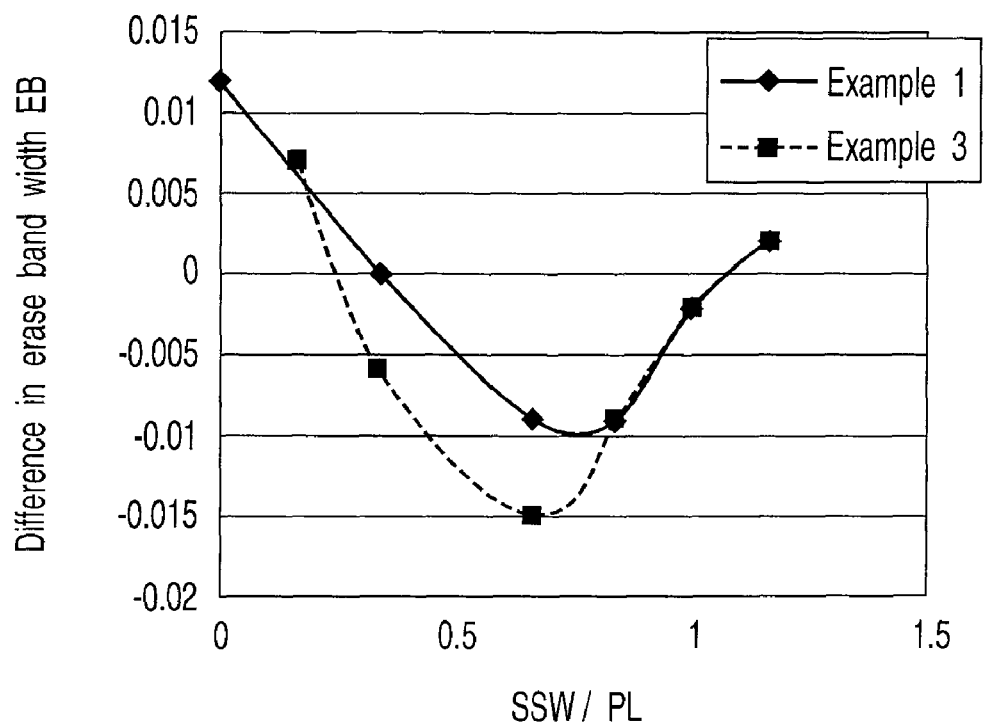
F I G. 9
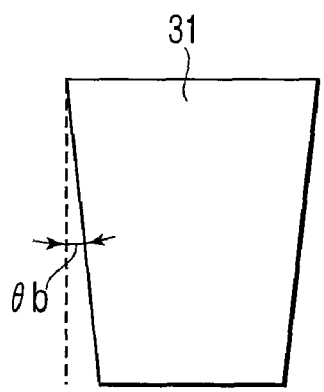
F I G. 10

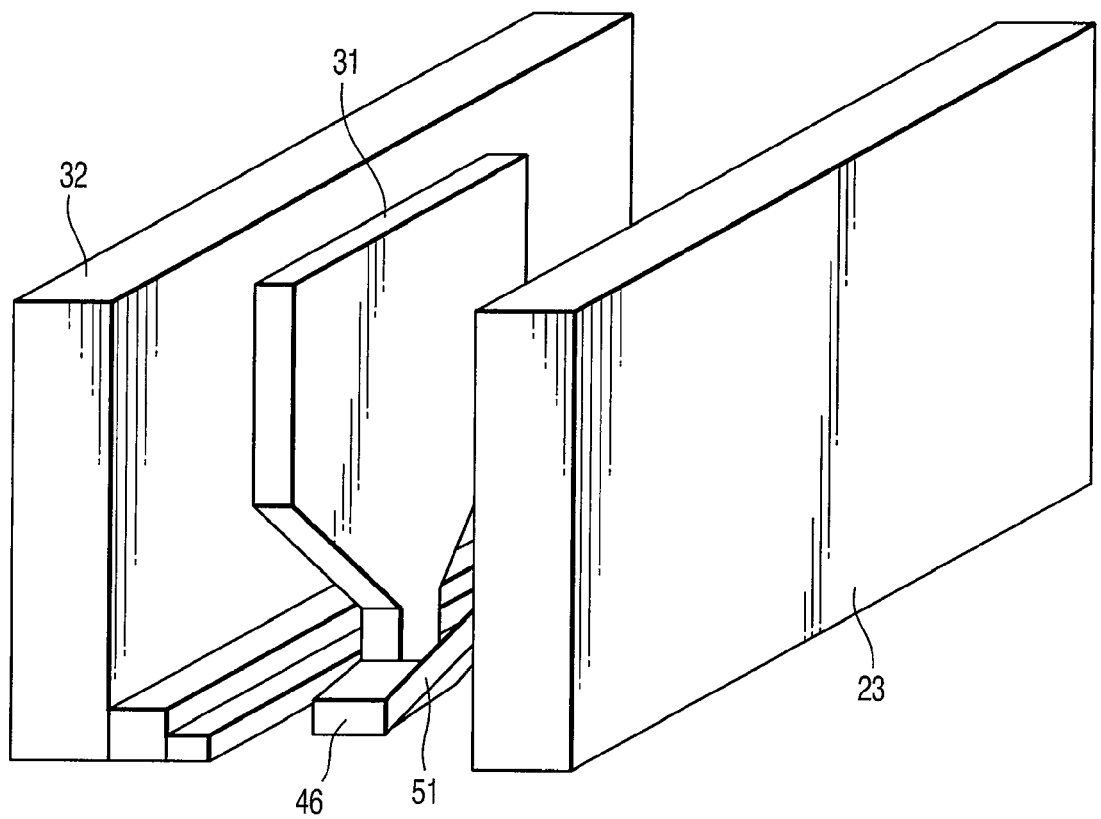
F I G. 1 5

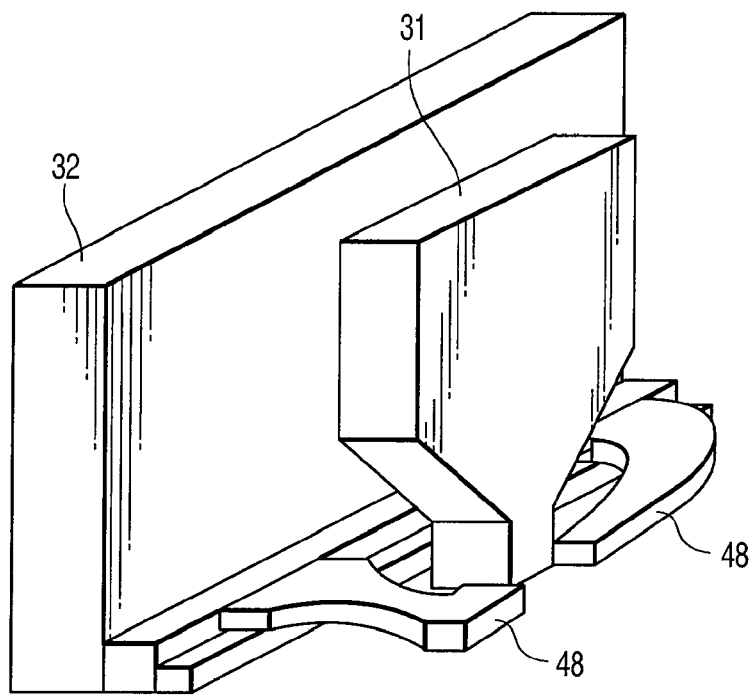
F I G. 1 8
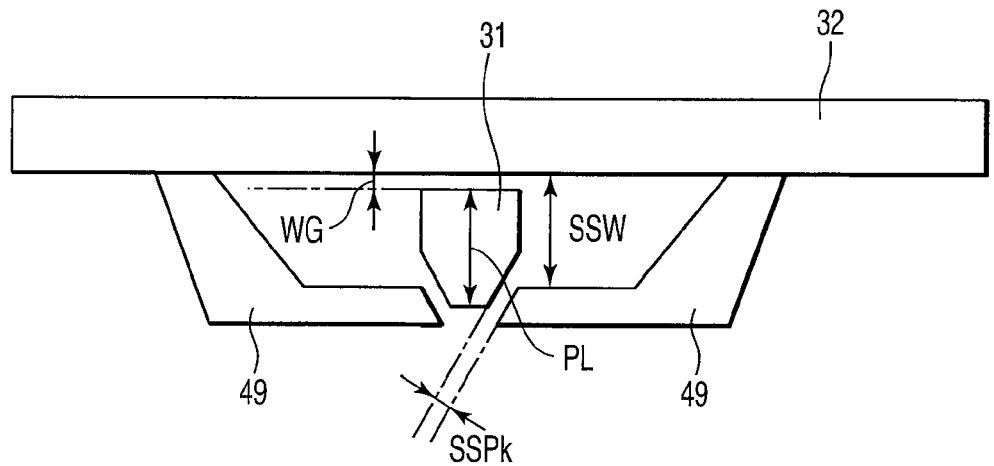
F I G. 1 9

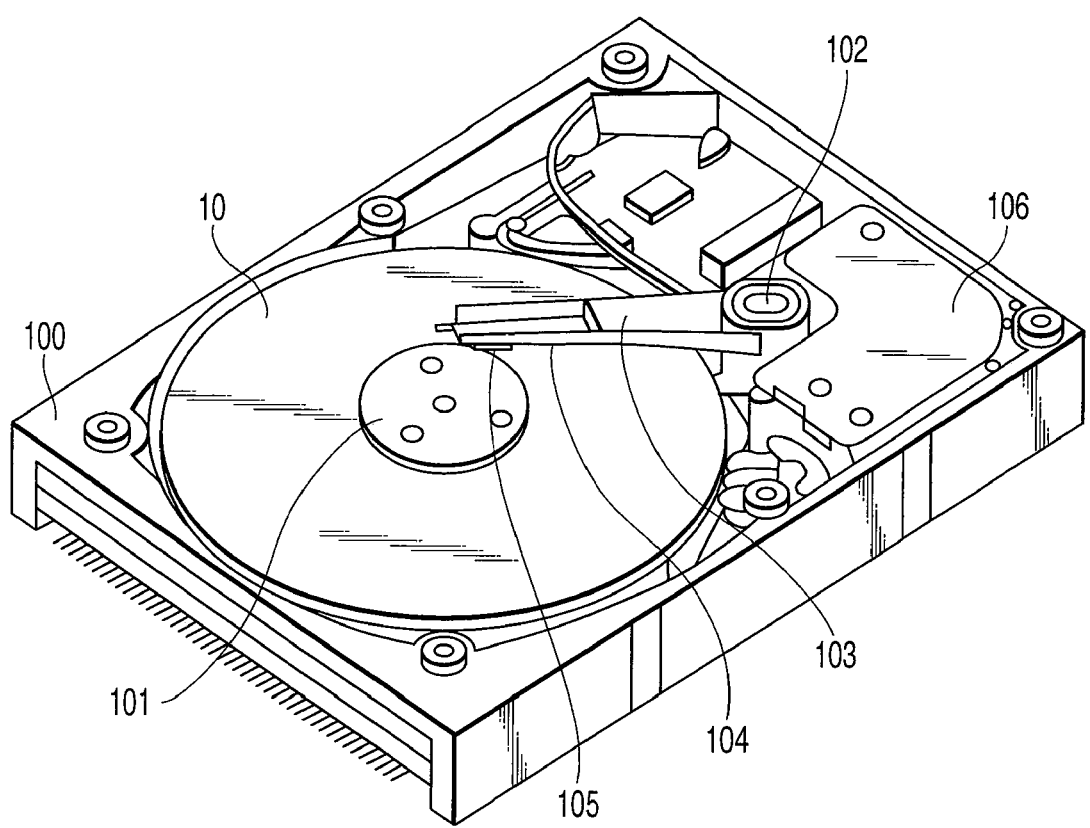
F I G. 2 0

PERPENDICULAR MAGNETIC RECORDING HEAD PROVIDED WITH SIDE SHIELD AND MAGNETIC DISK APPARATUS USING THE SAME

CROSS-REFERENCE TO RELATED APPLICATIONS

This application is a divisional of U.S. application Ser. No. 11/797,447, filed May 3, 2007 now U.S. Pat. No. 8,169,741 and for which priority is claimed under 35 U.S.C. §121. This application is based upon and claims the benefit of priority under 35 U.S.C. §119 from Japanese Patent Applications No. 2006-132844, filed May 11, 2006; and No. 2006-297011, filed Oct. 31, 2006, the entire contents all applications are incorporated herein by reference in their entireties.

BACKGROUND

1. Field

One embodiment of the present invention relates to a perpendicular magnetic recording head having a side shield, and a magnetic disk apparatus including the perpendicular magnetic recording head.

2. Description of the Related Art

In magnetic disk apparatuses of a perpendicular recording system, a perpendicular write head performs recording on a magnetic disk near the trailing edge of a main pole. However, if the perpendicular write head is located over the inner or outer periphery of the magnetic disk, the longitudinal direction of the main pole may skew significantly relative to the track direction. The write head at a high skew angle causes a writing operation to be performed not only at the trailing edge of the main pole but also at the side edge. In this case, the side edge of the main pole may disadvantageously erase a part of signals already recorded in the adjacent track (side erase). When the guard band width between recording tracks is increased in order to avoid the possible side erase at the side edge of the main pole, the track density is hard to be improved.

A perpendicular write head has been known which has a main pole, an auxiliary pole (return pole), and a side shield processed to surround the trailing edge and side edge of the main pole in the air bearing surface. The side shield extends from the vicinity of the trailing edge of the main pole to the auxiliary pole, with the trailing edge of the side shield joined to the auxiliary pole (Jpn. Pat. Appln. KOKAI Publication No. 2005-190518). The perpendicular write head can reduce the erase width by the side edge of the main pole because of the presence of the side shield. However, the side shield configured as described above may degrade the recording ability of the main pole directly under thereof, resulting in insufficient overwriting. Thus, disadvantageously, high signal quality cannot be achieved.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is a perspective view showing the write head in FIG. 2;

FIG. 4 is a plan view of the write head in FIG. 2 as viewed from the air bearing surface (ABS);

FIG. 9 is a diagram showing the relationship between a difference in erase band width EB and an SSW/PL ratio;

FIG. 10 is a diagram illustrating the bevel angle of a main pole;

FIG. 15 is a perspective view of a magnetic head according to a sixth embodiment;

FIG. 18 is a perspective view of a write head according to an eighth embodiment;

FIG. 19 is a plan view of a write head according to a ninth embodiment as viewed from ABS; and FIG. 20 is a perspective view of a magnetic disk apparatus according to the embodiments of the present invention.

DETAILED DESCRIPTION

Various embodiments according to the invention will be described hereinafter with reference to the accompanying drawings. In general, according to one embodiment of the present invention, there is provided a perpendicular magnetic recording head comprising: a main pole which generates a recording magnetic field; and a side shield magnetically spaced from the main pole in a cross-track direction, wherein a point on a trailing edge of the side shield which is closest to the main pole is positioned on a leading side of a trailing edge of the main pole.

According to another embodiment of the present invention, there is provided a perpendicular magnetic recording head comprising: a main pole which generates a recording magnetic field; a return pole which forms a closed magnetic circuit for the recording magnetic field; and a side shield magnetically spaced from the main pole in a cross-track direction, wherein a point on a trailing edge of the side shield which is closest to the main pole is positioned on a leading side of a trailing edge of the main pole.

Figure 1A:
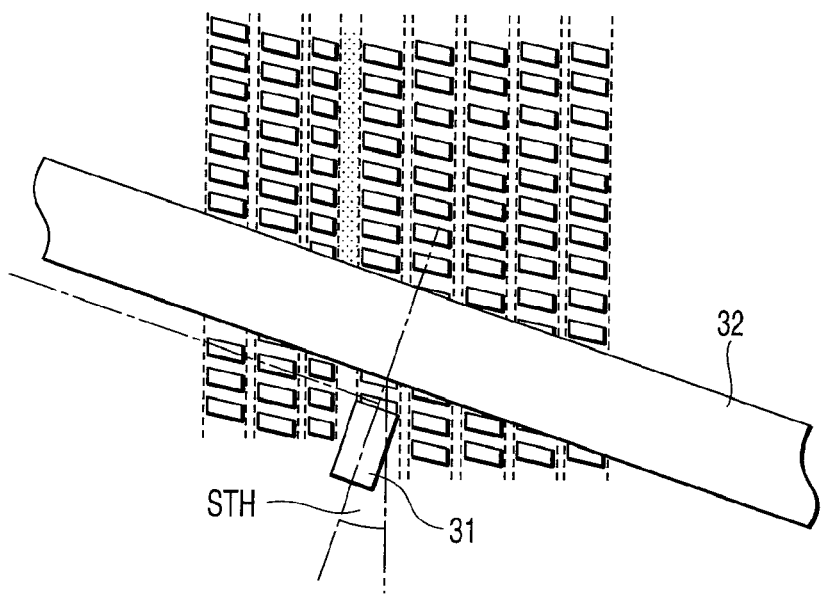
FIGS. 1A and 1B are diagrams illustrating a problem with a magnetic head at a skew angle.
Figure 1B:
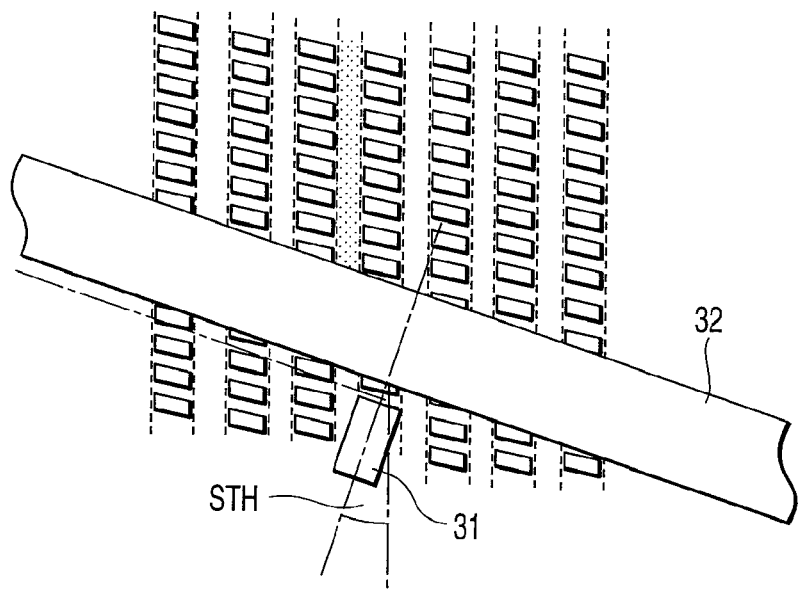

First, with reference to FIGS. 1A and 1B, description will be given of a problem with a magnetic head at a skew angle. FIG. 1A shows the skew angle STH of a main pole 31 relative to the track direction. Reference numeral 32 in the figure denotes a return pole. As shown in the figure, at a high skew angle, a writing operation is performed not only at the trailing edge of the main pole 31 but also at a side edge of the main pole 31. In this case, the side edge of the main pole 31 may disadvantageously erase signals already recorded in the adjacent track (side erase). As shown in FIG. 1B, when the guard band width between recording tracks is increased in order to avoid possible side erase by the side edge of the main pole 31, the track density is hard to be improved.

The present invention provides a perpendicular magnetic recording head and a magnetic disk apparatus which can inhibit the possible side erase at the side edge of the main pole without degrading the recording ability of the main pole.

Figure 2:
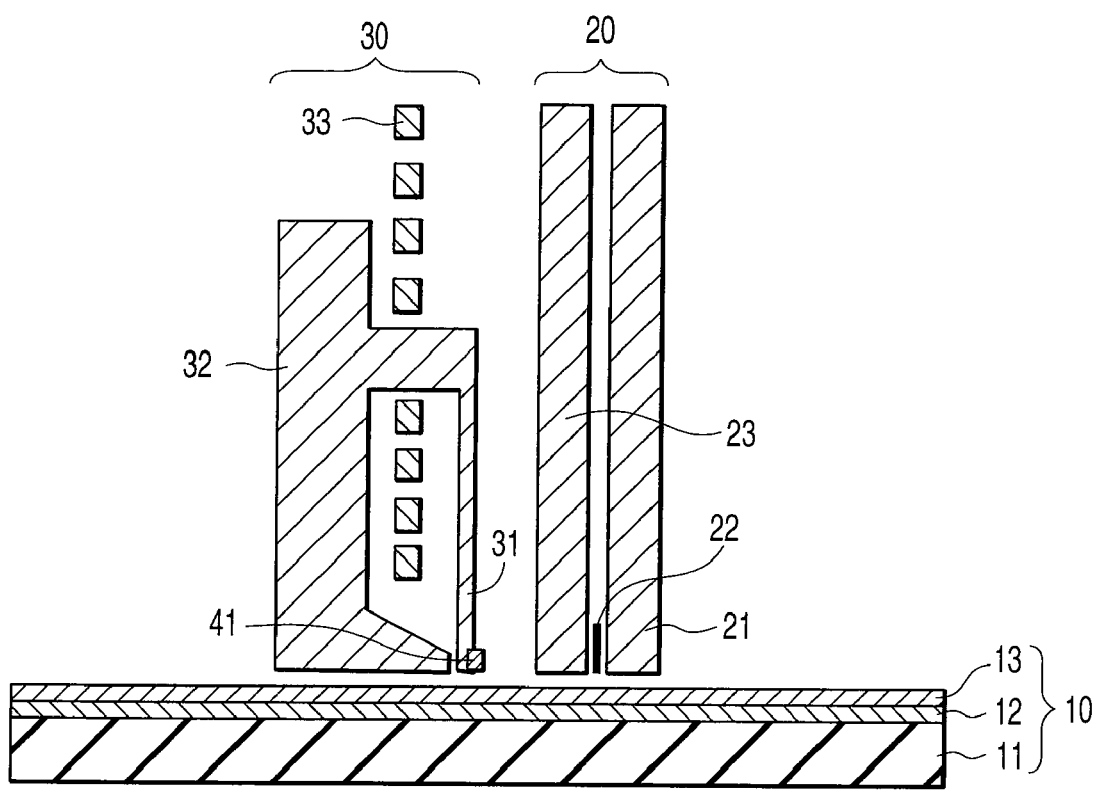
FIG. 2 is a cross-sectional view showing a perpendicular magnetic disk apparatus including a magnetic head and a perpendicular recording medium according to a first embodiment.

FIG. 2 is a cross-sectional view showing a perpendicular magnetic disk apparatus including a magnetic head according to a first embodiment of the present invention and a perpendicular recording medium. FIG. 3 is a perspective view showing the write head in FIG. 2. FIG. 4 is a plan view of the write head in FIG. 2 as viewed from the air bearing surface (ABS).

A magnetic disk 10 is a perpendicular double-layer medium including a substrate 11, and a soft underlayer 12 and a perpendicular recording layer 13 with magnetic anisotropy in the perpendicular direction to the disk plane, which are provided on the substrate 11.

The magnetic head is of a separate type having a read head 20 and a write head 30 separated to each other. The read head 20 is composed of a magnetoresistive film 22 and shield films 21 and 23 located on the leading side and the trailing side of the magnetoresistive film 22.

The write head has the main pole 31 comprising a high-permeability material that generates recording magnetic fields in the perpendicular direction to the disk plane, side shields 41 magnetically spaced from the main pole 31 in the cross-track direction and formed of a high-permeability material, a return pole 32 located on the trailing side of the main pole 31 to efficiently close a magnetic circuit for recording magnetic fields via the soft underlayer 12 of the magnetic disk 10 directly under the main pole 31, and a coil 33 wound around the magnetic circuit that connects the main pole 31 and the return pole 32 at a position spaced apart from ABS in order to pass magnetic fluxes through the main pole 31. The return pole 32 need not be necessarily provided.

As shown in these figures, points X on the trailing edge of the side shields 41 located closest to the main pole 31 are positioned on the leading side of the trailing edge of the main pole 31.

In this embodiment, the leading edge of the main pole 31 is narrower than the trailing edge thereof. The side shields 41 are located on the leading side of and in the vicinity of the main pole 31 so as to be divided into two parts on the both sides of the main pole 31. The side edges of the two side shields 41 are formed along the side edges of the main pole 31. The side shields 41 are recessed from ABS toward the direction away from the main pole 31.

FIG. 4 shows parameters for evaluating the performance of the write head, the distance SSW between the leading edge of the return pole 32 and the points X on the trailing edge of the side shield 41 closest to the main pole 31, the pole length PL of the main pole 31, the shortest distance SSP between the main pole 31 and the side shields 41, and the gap length WG between the leading edge of the return pole 32 and the trailing edge of the main pole 31.

Here, the points on the trailing edge of the side shields 41 closest to the main pole 31 are defined as X. The distance SSW is defined as that between the leading edge of the return pole 32 and the closest points X. The reason is as follows. Without any skew angle, as shown in FIG. 4, the trailing edge of the side shields 41 may not be parallel to the cross-track direction but may be skewed from the cross-track direction (this will be described below). Regardless of the shape of the side shields 41, the performance of the write head can be evaluated by using, as a parameter, the distance SSW between the leading edge of the return pole 32 and the points X on the trailing edge of the side shields 41 closest to the main pole 31. However, when the trailing edge of the side shields 41 are parallel to the cross-track direction as shown in FIG. 4, the distance SSW between the leading edge of the return pole 32 and the trailing edge of the side shields 41 is constant at any positions. Accordingly, the distance SSW may hereinafter be simply referred to as the distance between the return pole 32 and the side shields 41.

If the return pole 32 is not provided, a parameter corresponding to the distance SSW is the distance SZ between the trailing edge of the main pole 31 and the points X on the trailing edge of the side shields 41 closest to the main pole 31.

Figure 5:
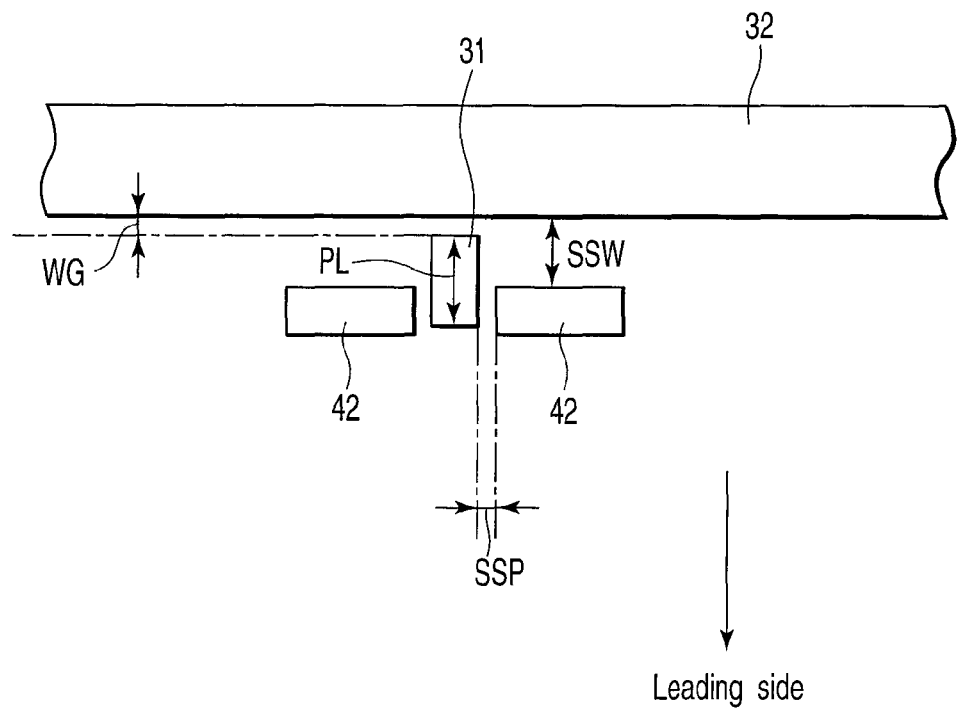
FIG. 5 is a plan view of a write head according to a second embodiment as viewed from ABS.

FIG. 5 is a plan view of a write head according to a second embodiment of the preset invention as viewed from ABS. In this figure, the width of the leading edge of the main pole 31 is almost equal to the width of the trailing edge thereof. Side shields 42 are located in the vicinity of the leading side of the main pole 31 so as to be divided into two parts located on the both sides of the main pole 31. The side edges of the two side shields 42 are formed along the side edges of the main pole 31, respectively.

Figure 6:
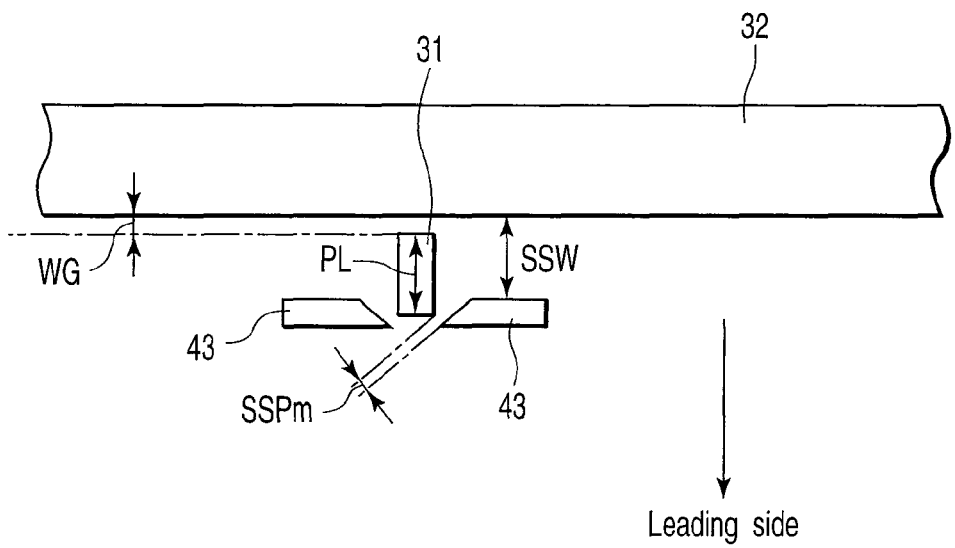
FIG. 6 is a plan view of a write head according to a third embodiment as viewed from ABS.

FIG. 6 is a plan view of a write head according to a third embodiment of the preset invention as viewed from ABS. In this figure, the width of the leading edge of the main pole 31 is almost equal to the width of the trailing edge thereof. Side shields 43 are located in the vicinity of the leading side of the main pole 31 so as to be divided into two parts located on the both sides of the main pole 31. The distance between the side edges of the two side shields 43 and the main pole 31 is shorter on the leading side and longer on the trailing side.

Figure 7:
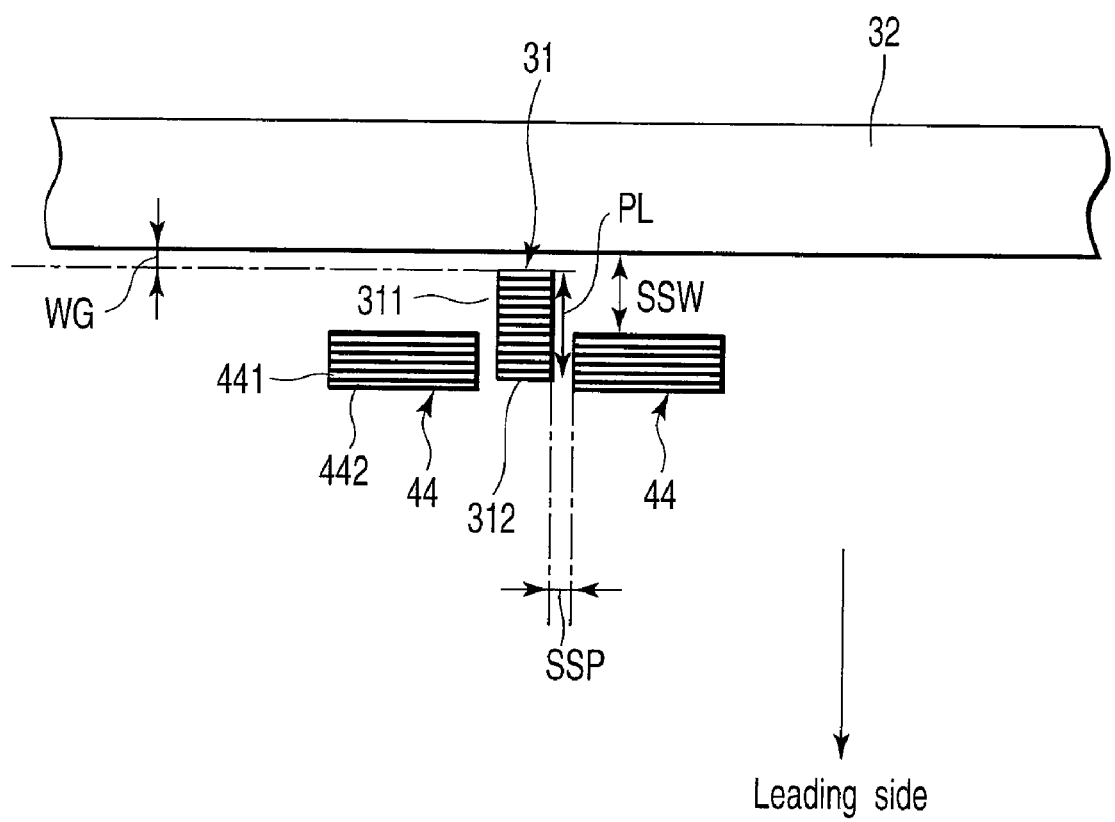
FIG. 7 is a plan view of a write head according to a fourth embodiment as viewed from ABS.

FIG. 7 is a plan view of a write head according to a fourth embodiment of the preset invention as viewed from ABS. The forms of the main pole 31 and side shields 44 on ABS shown in FIG. 7 is almost the same as those in FIG. 4. However, in FIG. 7, the main pole 31 has a multilayer structure in which magnetic layers 311 and nonmagnetic layers 312 are alternately stacked along the track direction. The side shields 44 have a multilayer structure in which magnetic layers 411 and nonmagnetic layers 442 are alternately stacked along the track direction.

Figure 8A:
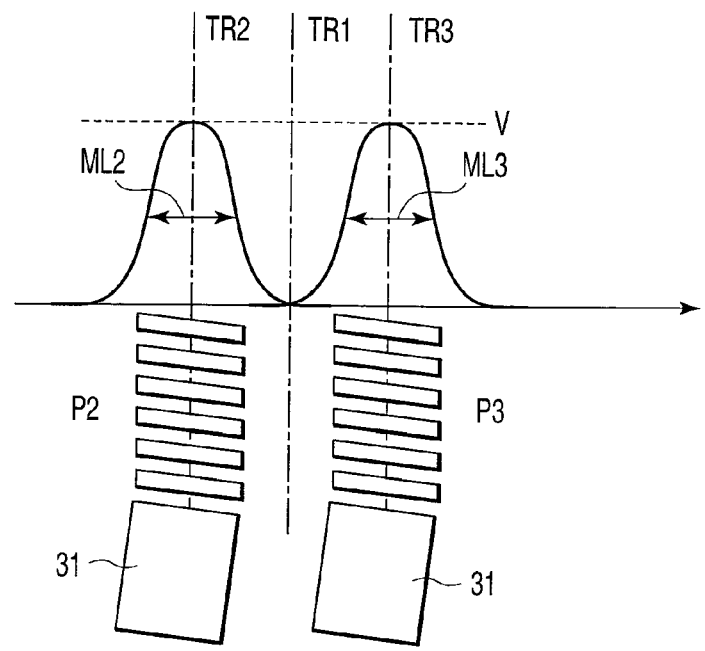
FIGS. 8A and 8B are diagrams illustrating an erase band width.
Figure 8B:
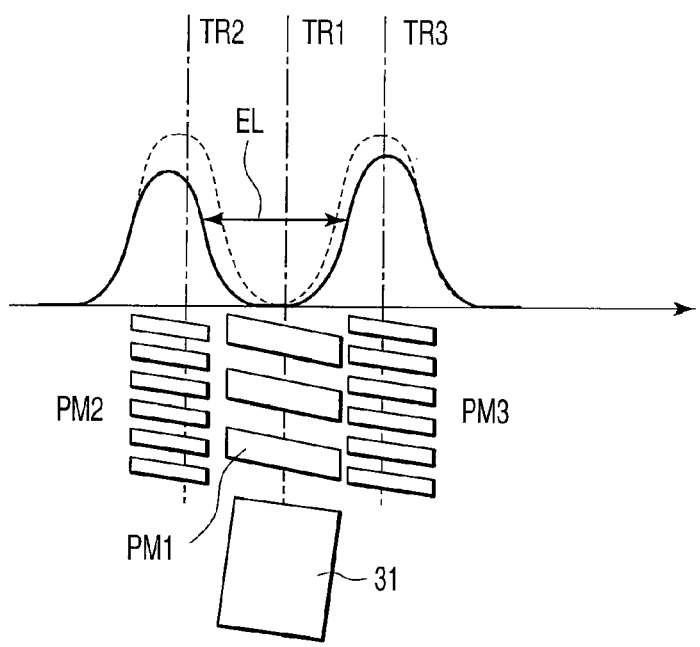

In the embodiments of the present invention, an erase band width is used as an index for evaluating the performance of the write head. The erase band width will be described with reference to FIGS. 8A and 8B. As shown in FIGS. 8A and 8B, a central track to be focused on is referred to as TR1 and adjacent tracks on both sides of the central track are referred to as TR2 and TR3.

First, as shown in FIG. 8A, recording signals P2 and P3 are recorded in the adjacent tracks TR2 and TR3 on both sides of the central track TR1. The magnetic track widths of the recording signals P2 and P3 are defined as half value widths ML2 and ML3 of peak values V in track profiles. In the adjacent track TR2, recording is performed in locations where the distance between TR2 and TR1 is shorter than the magnetic track width ML2 of the recording signals P2. In the adjacent track TR3, recording is performed in locations where the distance between TR3 and TR1 is shorter than the magnetic track width ML3 of the recording signals P3.

Then, as shown in FIG. 8B, recording signals P1 are recorded in the central track TR1. After recording in the central track TR1, the recording signals P2 and P3 written in the adjacent tracks TR2 and TR3 on both sides of the central track TR1 become signals PM2 and PM3 with reduced outputs and reduced recording widths. FIG. 8B shows the track profiles of the signals PM2 and PM3 in full line. In FIG. 8B, the distance between the recording signals PM2 and PM3 corresponding to the half values of the outputs V of the recording signals P2 and P3 in FIG. 8A is defined as an erase width EL. It is possible to determine that a larger erase width EL indicates that the adjacent tracks have been erased and that a smaller erase width EL indicates that the adjacent tracks have been less erased. Accordingly, the value of the erase width EL allows the performance of the write head to be evaluated. Similarly, the performance of the write head can be evaluated on the basis of the erase band width EB=erase width EL−magnetic recording width ML2 (or ML3).

FIG. 9 is a diagram showing the relationship between the difference in erase band width EB and the ratio SSW/PL of SSW (the distance between the return pole and the side shield) to PL (the pole length of the main pole). The difference in erase band width EB on the axis of ordinate in FIG. 9 refers to the difference in erase band width between a write head without a side shield and a write head with a side shield; the write heads have an equivalent recording ability. Accordingly, if the write head with the side shield makes the value of the difference in erase band width EB negative, this means that possible side erase can be inhibited. FIG. 9 shows results for the write heads according to the first and third embodiments. The figure shows that both write heads can reduce the erase band width when the SSW/PL ratio is between about 1/3 and 1.

The erase band width EB is also affected by the bevel angle of the main pole. As shown in FIG. 10, the bevel angle $\theta_b$ (deg) is the angle between the side edge of the main pole and the down track direction.

Figure 11:
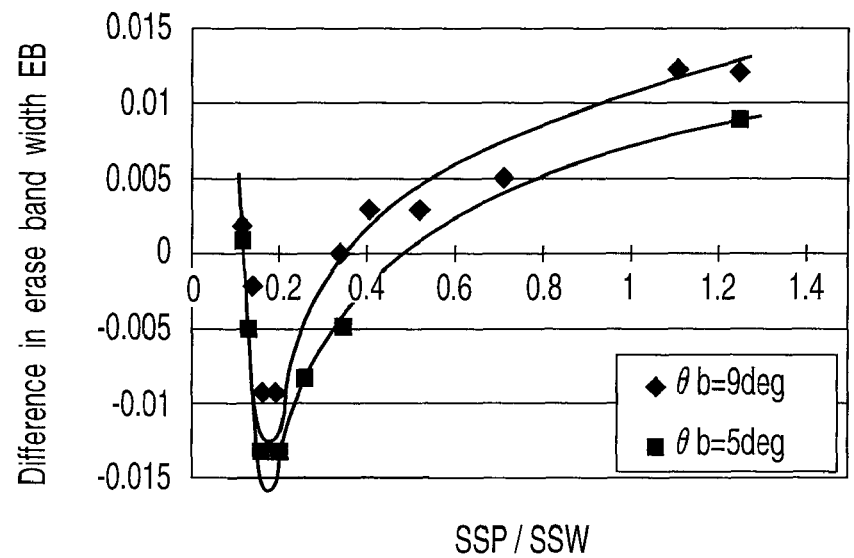
FIG. 11 is a diagram showing the relationship between the difference in erase band width EB and the SSW/PL ratio observed when main poles with different bevel angles are used.

For the magnetic head in the example shown in FIG. 4, the differences in erase band width were examined using two main poles 31 with different bevel angles $\theta_b$ (deg) and varying SSP and SSW. FIG. 11 shows the relationship between the difference in erase band width EB and the ratio SSP/SSW of SSP to SSW. The figure indicates that the difference in erase band width EB decreases consistently with SSP/SSW, showing the effect of reducing the erase band. For example, at a bevel angle $\theta_b$ (deg) of 9°, the erase band can be reduced below that in conventional magnetic heads in a range of: 0.1<SSP/SSW<0.35. At a bevel angle $\theta_b$ (deg) of 5°, the erase band can be reduced below that in conventional magnetic heads in a range of: 0.1<SSP/SSW<0.5.

Figure 12:
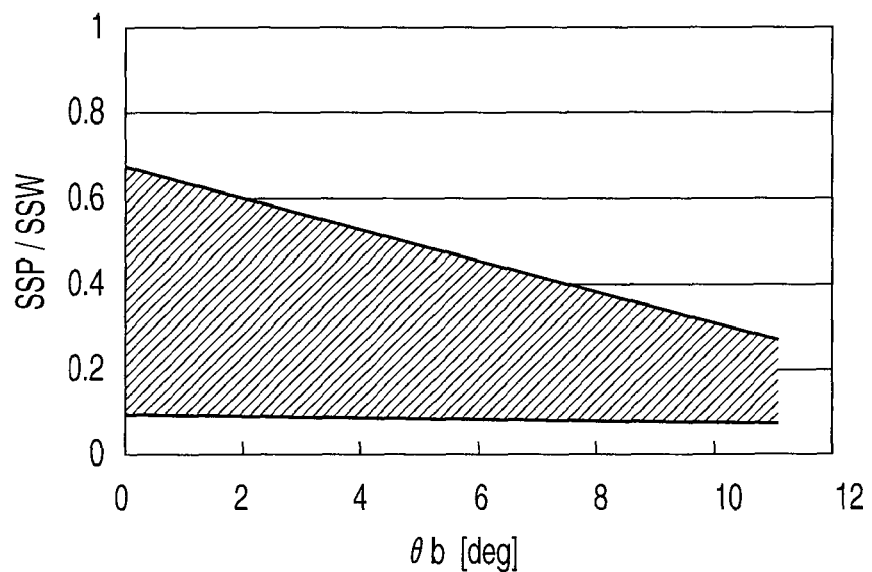
FIG. 12 is a diagram showing the dependence, on the bevel angle, of SSP/SSW ratio by which an effect of reducing the erase band can be exerted.

FIG. 12 shows the dependence, on the bevel angle, of SSP/SSW ratio by which the effect of reducing the erase band can be exerted. The figure shows that the effect of reducing the erase band is exerted in a range of: 0.1<SSP/SSW<0.7. Further, the upper limit value of SSP/SSW depends on the bevel angle $\theta_b$ (deg) and is expressed by: $-0.034 \times \theta_b + 0.67$. Therefore, the effect of reducing the erase band is particularly exerted in the range where the relationship $0.1 < SSP/SSW < -0.034 \times \theta_b + 0.67$ is satisfied.

Furthermore, the distance SSW between the return pole and the side shield is preferably at least twice as long as the gap length WG between the return pole and the main pole.

Figure 13:
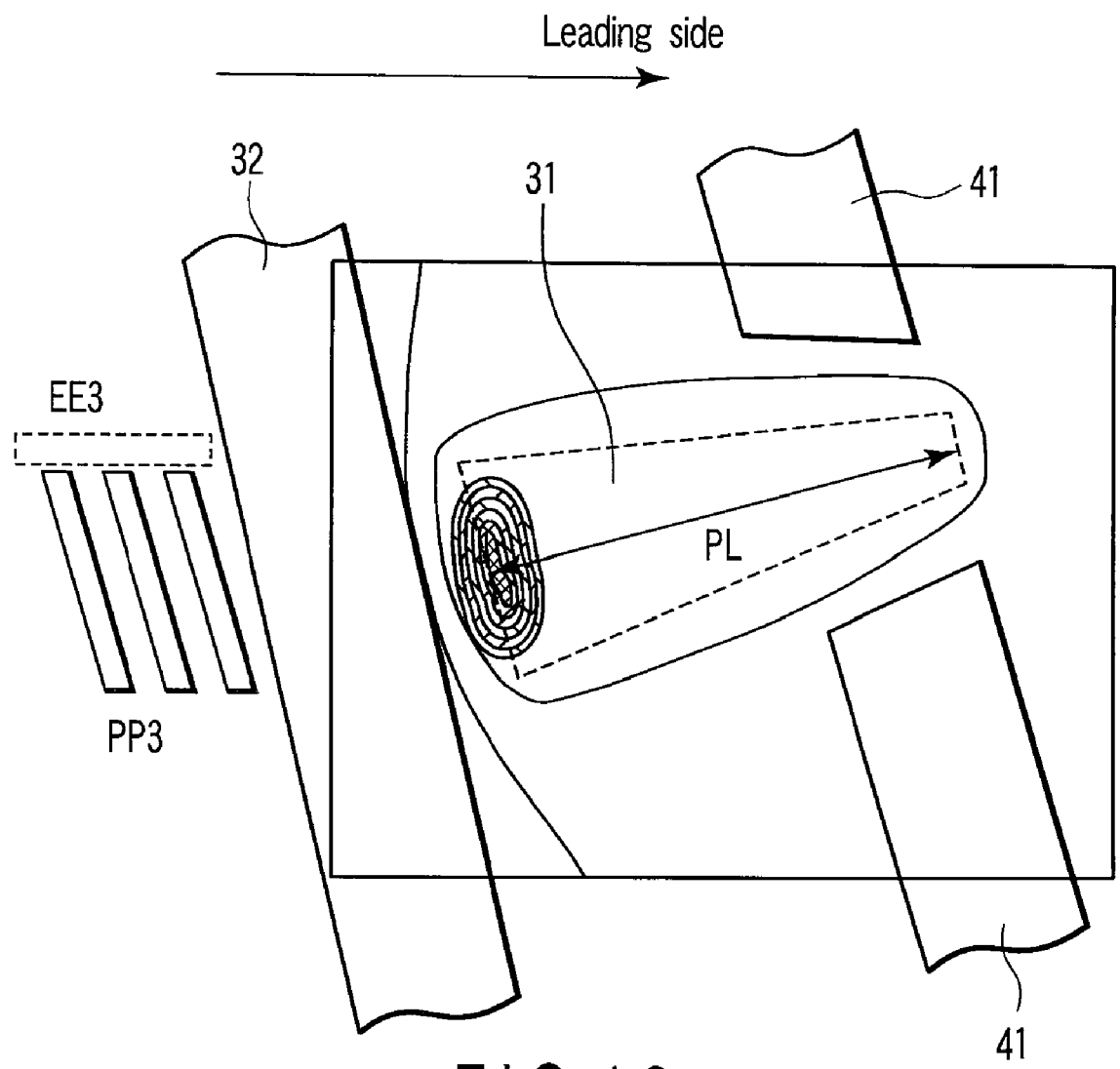
FIG. 13 is a diagram showing the two-dimensional distribution of magnetic fields leaking from a write head according to the embodiments of the present invention.

FIG. 13 is a plan view of the write head according to the embodiments of the present invention as viewed from ABS, the plan view being overlapped by the two-dimensional distribution of magnetic fields leaking from the write head. This write head includes side shields 41 having its trailing edge positioned on the leading side of the trailing edge of the main pole 31. This enables the magnetic field intensity in the vicinity of the trailing edge of the main pole 31 to be kept comparable to that obtained with a write head without any side shield. Moreover, as described with reference to FIG. 9, the side shields 41 make it possible to reduce the erase band width EE3 caused by the side edge of the main pole 31.

On the other hand, with a write head having a side shield extending from the vicinity of the trailing edge of the main pole to the return pole and joined to the return pole as in Jpn. Pat. Appln. KOKAI Publication No. 2005-190518, which is already described, the erase band width can be reduced, but the magnetic field intensity at the trailing edge of the main pole decreases to degrade the quality of signals in the on-track recording pattern. Thus, the conventional technique can increase the track density but is disadvantageous in that it fails to increase linear density and thus the recording density of the magnetic disk apparatus.

Figure 14A:
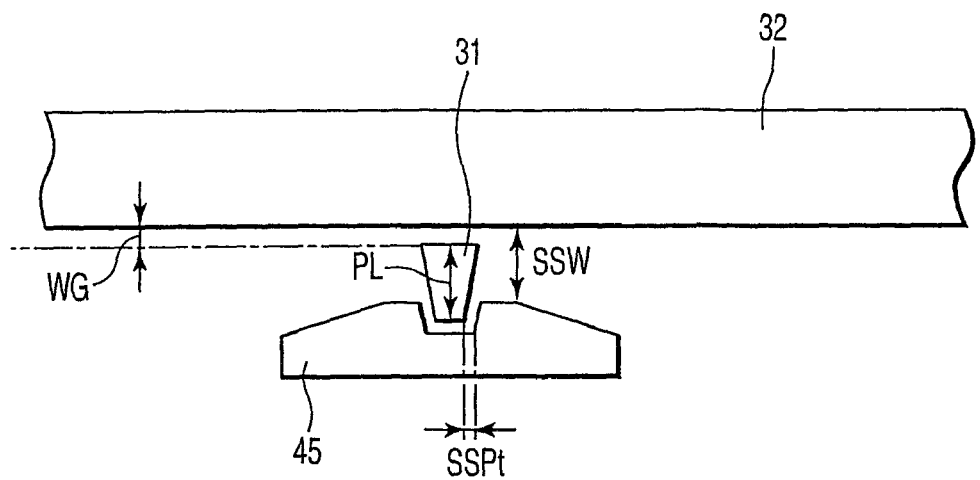
FIGS. 14A and 14B are a plan view of a write head according to a fifth embodiment as viewed from ABS and a perspective view of the write head, respectively.
Figure 14B:
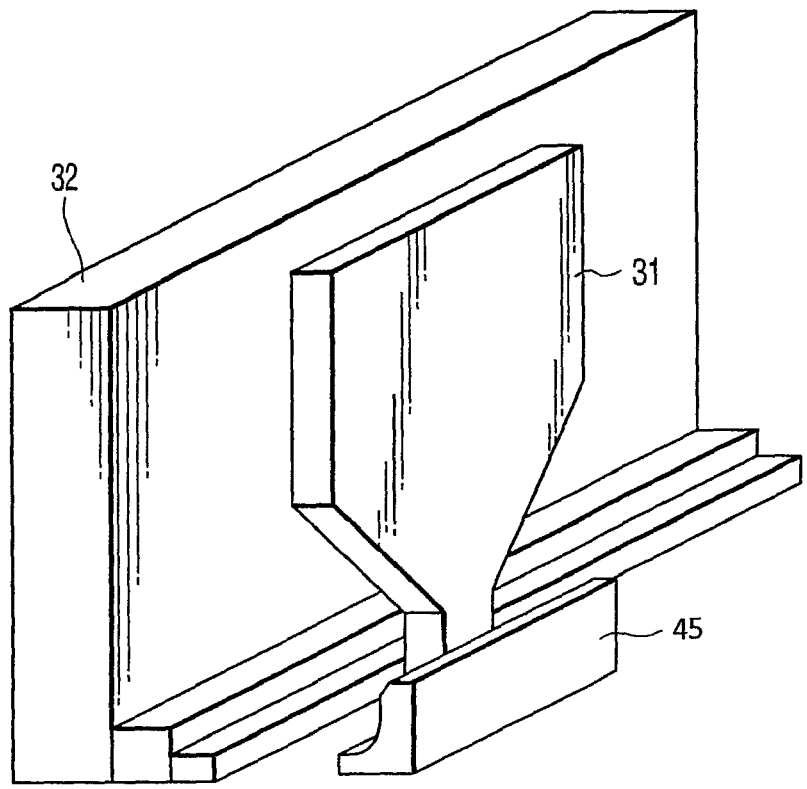

FIGS. 14A and 14B are a plan view of a write head according to a fifth embodiment of the present invention as viewed from ABS and a perspective view of the write head, respectively. A side shield 45 in this write head is provided on the leading side of the main pole 31 and magnetically spaced from the side edge and leading edge of the main pole 31. However, unlike the side shields 41 in FIG. 4, the side shield 45 is not divided into two parts located on the both sides of the main pole 31.

Also in this write head, it is preferable that the ratio SSW/PL of the distance SSW between the return pole 32 and the side shield 45 to the pole length PL of the main pole is roughly between 1/3 and 1.

FIG. 15 is a perspective view of a magnetic head according to a sixth embodiment of the present invention. A side shield 46 in the write head is connected to a shield film 23 in the read head via a connection portion 51. The shield film 23 and the side shield 46 may be connected on the depth side from ABS.

Figure 16A:
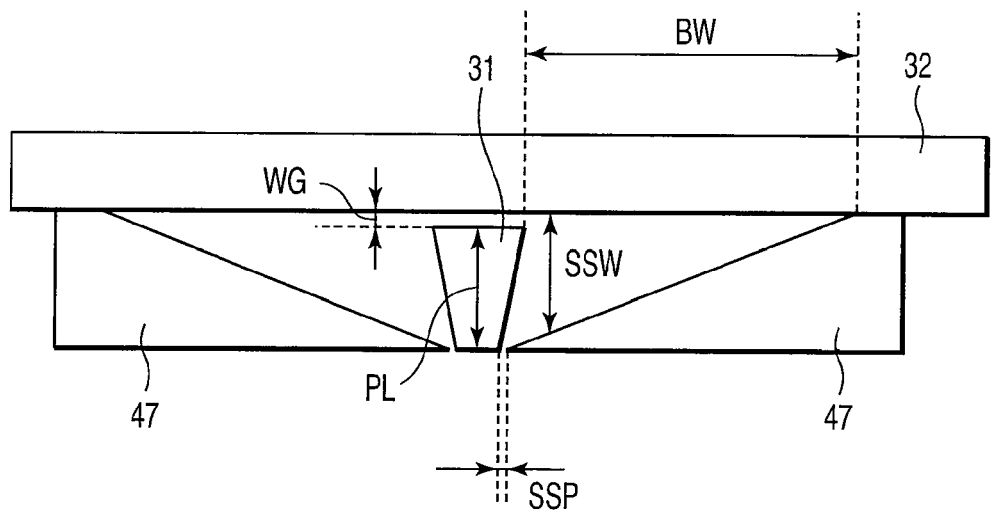
FIGS. 16A and 16B are a plan view of a write head according to a seventh embodiment as viewed from ABS and a perspective view of the write head, respectively.
Figure 16B:
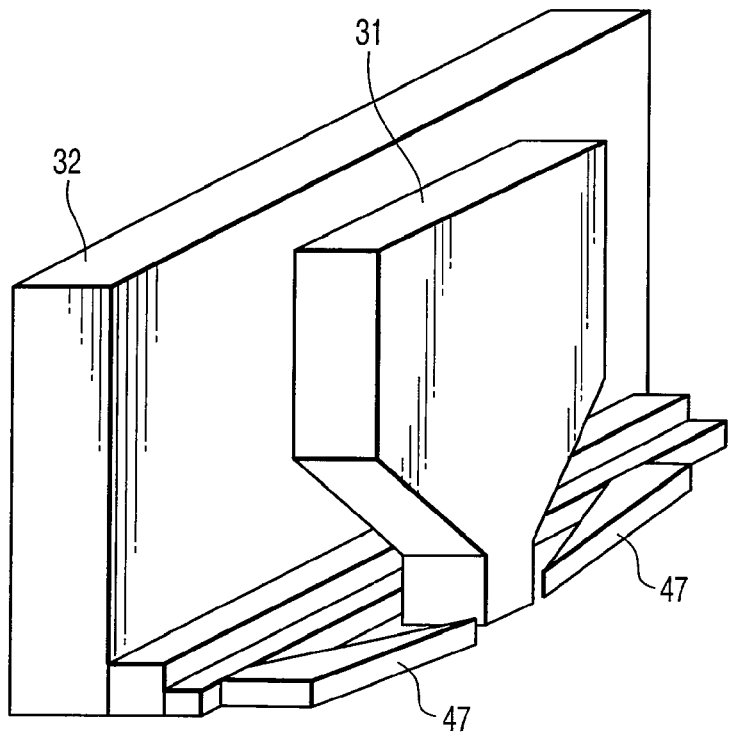

FIGS. 16A and 16B are a plan view of a write head according to a seventh embodiment of the present invention as viewed from ABS and a perspective view of the write head, respectively. Side shields 47 in this write head are magnetically spaced from the main pole 31 in the cross-track direction and divided into two parts located on the both sides of the main pole 31 in the vicinity of the leading side of the main pole 31. However, the side shields 47 are joined to the return pole 32 at positions spaced apart from the main pole 31.

Figure 17:
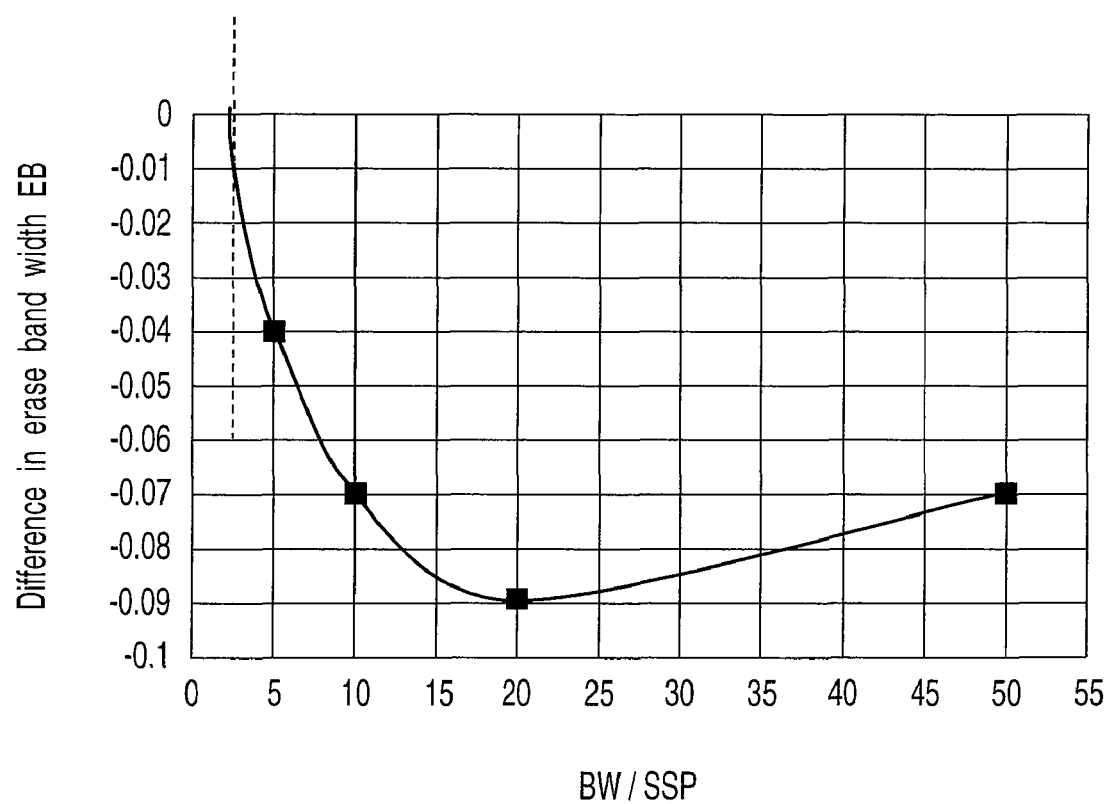
FIG. 17 is a diagram illustrating the effects of the write head according to the seventh embodiment.

With reference to FIG. 17, description will be given of the effects of the write head according to the seventh embodiment. FIG. 17 is a diagram showing the relationship between the difference in erase band width EB and the ratio BW/SSP of BW (the distance between the corners of the trailing edge of the main pole 31 and the junctions between the side shields 47 and the return pole 32) to SSP (the shortest distance between the main pole 31 and the side shields 47).

Here, the difference in erase band width EB on the axis of ordinate in FIG. 17 is as described with reference to FIG. 9. FIG. 17 indicates that a BW/SSP ratio of 3 or more is effective for reducing the erase band width. In particular, a BW/SSP ratio of 10 or more is significantly effective for reducing the erase band width.

FIG. 18 is a perspective view of a write head according to an eighth embodiment of the present invention. Side shields 48 in this write head are, like the side shields 47 in FIG. 16B, magnetically spaced from the main pole 31 in the cross-track direction and divided into two parts located on the both sides of the main pole 31 in the vicinity of the leading side of the main pole 31. However, the side shields 48 are joined to the return pole 32 at positions spaced apart from the main pole 31. Note that the shapes of the side shields 48 are different from those of the side shields 47.

Also with this write head, as described with reference to FIG. 17, a BW/SSP ratio of 3 or more is effective for reducing the erase band width. A BW/SSP ratio of 10 or more is significantly effective for reducing the erase band width.

FIG. 19 is a plan view of a write head according to a ninth embodiment of the present invention. The main pole 31 of this write head has tapered leading side edges as well as the leading edge narrower than the trailing edge. Side shields 49 in this write head are magnetically spaced from the main pole 31 in the cross-track direction and divided into two parts located on both sides of the main pole 31 in the vicinity of the leading side of the main pole 31. However, the side shields 49 are joined to the return pole 32 at positions spaced apart from the main pole 31.

This write head also makes it possible to reduce the erase band width when the SSW/PL ratio is roughly between 1/3 and 1. Further, the erase band width is effectively reduced when the ratio BW/SSPk of BW to the shortest distance SSPk between the main pole 31 and the side shields 49 is 3 or more, particularly 10 or more.

As described above, the perpendicular magnetic recording head according to the present invention can inhibit the possible side erase at the side edge of the skewed main pole without degrading the recording ability of the main pole. This contributes greatly to increasing the recording density of the perpendicular magnetic disk apparatus.

FIG. 20 shows a perspective view of a magnetic disk apparatus according to embodiments of the present invention. The magnetic recording device has a perpendicular magnetic disk and a rotary actuator configured to position the perpendicular magnetic recording head over the magnetic disk.

As shown in FIG. 2, the magnetic disk 10 is a perpendicular double-layer medium including a soft underlayer and a perpendicular recording layer with magnetic anisotropy in the perpendicular direction to the disk plane. Recording tracks are concentrically formed on the magnetic disk 10. The magnetic disk 10 is rotatably installed on a spindle motor 101 provided in a housing 100. The rotary actuator includes an actuator arm 103, a suspension 104, a head slider 105, and a voice coil motor (VCM) 106.

A pivot 102 is provided in the vicinity of the magnetic disk 10. An actuator 103 is attached to the pivot 102. A suspension 104 is held at one end of the actuator arm 103. A head slider 105 is supported on a bottom surface of the suspension 104. A read head and a write head are formed in the head slider 105 as shown in FIG. 2. The write head is, for example, the one described in any of the first to ninth embodiments. A voice coil motor 106 is provided as an actuator at the other end of the actuator arm 103. The voice coil motor 106 drives the actuator arm 103, suspension 104, and head slider 105 to position the write head at any radial position over the magnetic disk 10.

In the magnetic disk apparatus with the rotary actuator shown in FIG. 20, when positioned over the inner or outer periphery of the magnetic disk 10, the write head is inclined at a high skew angle as shown in FIG. 1. As described above, the write head according to the present invention can inhibit the possible side erase at the side edge of the main pole even with a high skew angle without degrading the recording ability of the main pole.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A perpendicular magnetic recording head comprising:
a main pole which generates a recording magnetic field; and
a shield magnetically spaced from the main pole in a cross-track direction,
wherein a point on a trailing edge of the side shield which is closest to the main pole is positioned on a leading side of a trailing edge of the main pole, and
wherein the ratio SZ/PL of a distance SZ between the trailing edge of the main pole and the point on the trailing edge of the side shield which is closest to the main pole to a pole length PL of the main pole is 1/3 to 1.

2. A perpendicular magnetic recording head comprising:
a main pole which generates a recording magnetic field;
a return pole which forms a closed magnetic circuit for the recording magnetic field; and
a side shield magnetically spaced from the main pole in a cross-track direction;
wherein the side shield and the return pole being joined together at a position spaced apart from the main pole,
wherein a point on a trailing edge of the side shield which is closest to the main pole is positioned on a leading side of a trailing edge of the main pole, and
wherein the ratio BW/SSP of a distance BW between a corner of the trailing edge of the main pole and a junction between the side shield and the return pole to the shortest distance SSP between the main pole and the side shield is 3 or more.

3. A magnetic disk apparatus comprising:
a magnetic disk including a substrate, and a soft underlayer and a perpendicular recording layer having an easy axis of magnetization in a perpendicular direction to a disk plane which are provided on the substrate; and
a rotary actuator on which a perpendicular magnetic recording head is mounted, the rotary actuator being configured to position the perpendicular magnetic recording head over the magnetic disk,
wherein the perpendicular magnetic recording head comprises a main pole which generates a recording magnetic field and a side shield which is magnetically spaced from the main pole in a cross-track direction,
wherein a point on a trailing edge of the side shield which is closest to the main pole is positioned on a leading side of a trailing edge of the main pole, and
wherein the ratio SZ/PL of a distance SZ between the trailing edge of the main pole and the point on the trailing edge of the side shield which is closest to the main pole to a pole length PL of the main pole is 1/3 to 1.

4. A magnetic disk apparatus comprising:
a magnetic disk including a substrate, and a soft underlayer and a perpendicular recording layer having an easy axis of magnetization in a perpendicular direction to a disk plane which are provided on the substrate; and
a rotary actuator on which a perpendicular magnetic recording head is mounted, the rotary actuator being configured to position the perpendicular magnetic recording head over the magnetic disk, wherein the perpendicular magnetic recording head comprising: a main pole which generates a recording magnetic field; a return pole which forms a closed magnetic circuit for the recording magnetic field; and a side shield magnetically spaced from the main pole in a cross-track direction; the side shield and the return pole being joined together at a position spaced apart from the main pole, wherein a point on a trailing edge of the side shield which is closest to the main pole is positioned on a leading side of a trailing edge of the main pole, and wherein the ratio BW/SSP of a distance BW between a corner of the trailing edge of the main pole and a junction between the side shield and the return pole to the shortest distance SSP between the main pole and the side shield is 3 or more.

* * * * *